(12) United States Patent
Aoki et al.

(10) Patent No.: US 11,908,119 B2
(45) Date of Patent: Feb. 20, 2024

(54) ABNORMALITY DETECTION DEVICE FOR VEHICLE

(71) Applicant: DENSO CORPORATION, Kariya (JP)

(72) Inventors: Yutaka Aoki, Kariya (JP); Keiko Akiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 117 days.

(21) Appl. No.: 17/659,386

(22) Filed: Apr. 15, 2022

(65) Prior Publication Data

US 2022/0237765 A1 Jul. 28, 2022

Related U.S. Application Data

(63) Continuation of application No. PCT/JP2020/038502, filed on Oct. 12, 2020.

(30) Foreign Application Priority Data

Oct. 16, 2019 (JP) .................................. 2019-189634
Sep. 30, 2020 (JP) .................................. 2020-166005

(51) Int. Cl.
G06T 7/00 (2017.01)
H04N 23/951 (2023.01)
G01S 17/86 (2020.01)
G01S 7/497 (2006.01)

(52) U.S. Cl.
CPC ......... *G06T 7/0002* (2013.01); *H04N 23/951* (2023.01); *G01S 7/497* (2013.01); *G01S 17/86* (2020.01)

(58) Field of Classification Search
CPC ..... G06T 7/0002; H04N 23/951; G01S 17/86; G01S 7/497
See application file for complete search history.

(56) References Cited

U.S. PATENT DOCUMENTS

| 9,537,956 B1 | 1/2017 | Sibenac et al. |
| 2020/0142038 A1* | 5/2020 | Han ..................... G05D 1/0248 |
| 2020/0363512 A1* | 11/2020 | Plank .................... G01S 17/894 |

(Continued)

FOREIGN PATENT DOCUMENTS

| JP | H09-116892 A | 5/1997 |
| JP | 2014-070936 A | 4/2014 |

(Continued)

*Primary Examiner* — Sunghyoun Park
(74) *Attorney, Agent, or Firm* — MASCHOFF BRENNAN

(57) ABSTRACT

In an abnormality detection device for detecting whether there is an abnormality in either of an optical sensor and a camera that are used to detect objects around a vehicle, a correlation value calculation unit calculates a correlation value between at least one of a reflection intensity image that is detected by the optical sensor emitting light toward surroundings of the vehicle and then receiving reflected light of emitted light and a background light image that is detected by the optical sensor receiving light from the surroundings of the vehicle while the optical sensor is emitting no light, and a captured image of the surroundings from the camera. An abnormality determination unit is configured to, in response to the correlation value calculated by the correlation value calculation unit being out of a predefined range, determine that there is an abnormality in either of the optical sensor and the camera.

8 Claims, 8 Drawing Sheets

(56) References Cited

U.S. PATENT DOCUMENTS

2020/0379114 A1* 12/2020 Wu ..................... G01S 7/4812
2021/0058605 A1*  2/2021 Lajevardi ............. G01S 7/4863

FOREIGN PATENT DOCUMENTS

| JP | 2016-099821 A | 5/2016 |
| JP | 2019-145952 A | 8/2019 |
| WO | 2018091970 A1 | 5/2018 |
| WO | 2019186742 A1 | 10/2019 |

* cited by examiner

6 × 8SPAD

ABNORMALITY DETECTION DEVICE FOR VEHICLE

CROSS-REFERENCE TO RELATED APPLICATION

This application is a continuation application of International Application No. PCT/JP2020/038502 filed Oct. 12, 2020 which designated the U.S. and claims priority to Japanese Patent Application No. 2019-189634 filed with the Japan Patent Office on Oct. 16, 2019, and Japanese Patent Application No. 2020-166005 filed with the Japan Patent Office on Sep. 30, 2019, the entire contents of each of which are incorporated herein by reference.

BACKGROUND

Technical Field

This disclosure relates to a technique for detecting whether an abnormality is occurring in either of an optical sensor and a camera that are used to detect objects around a vehicle.

Related Art

There is a known technique for detecting occurrence of an abnormality in either of an optical sensor and a camera that are used to detect objects around a vehicle. In the known technique, a distance to an object is measured based on a time from emission of beam light from a light emitting unit of the optical sensor to reception of reflected light from the object by a plurality of light receiving elements of a light receiving unit. The light receiving unit outputs a distance image based on distances measured at respective pixels. Further, the light receiving unit outputs a first brightness image based on the light intensity of received reflected light.

In the above known technique, a second brightness image is acquired. The second brightness image is a captured image from the camera with each pixel representing the brightness of a surface of the object.

In the above known technique, the brightness of each pixel in the first brightness image is corrected based on a distance of the pixel. If a difference in brightness between a certain pixel in the corrected first brightness image and a corresponding pixel in the second brightness image is greater than a threshold, the pixel in the corresponding distance image is detected as an error pixel.

DESCRIPTION OF SPECIFIC EMBODIMENTS

Figure 1:
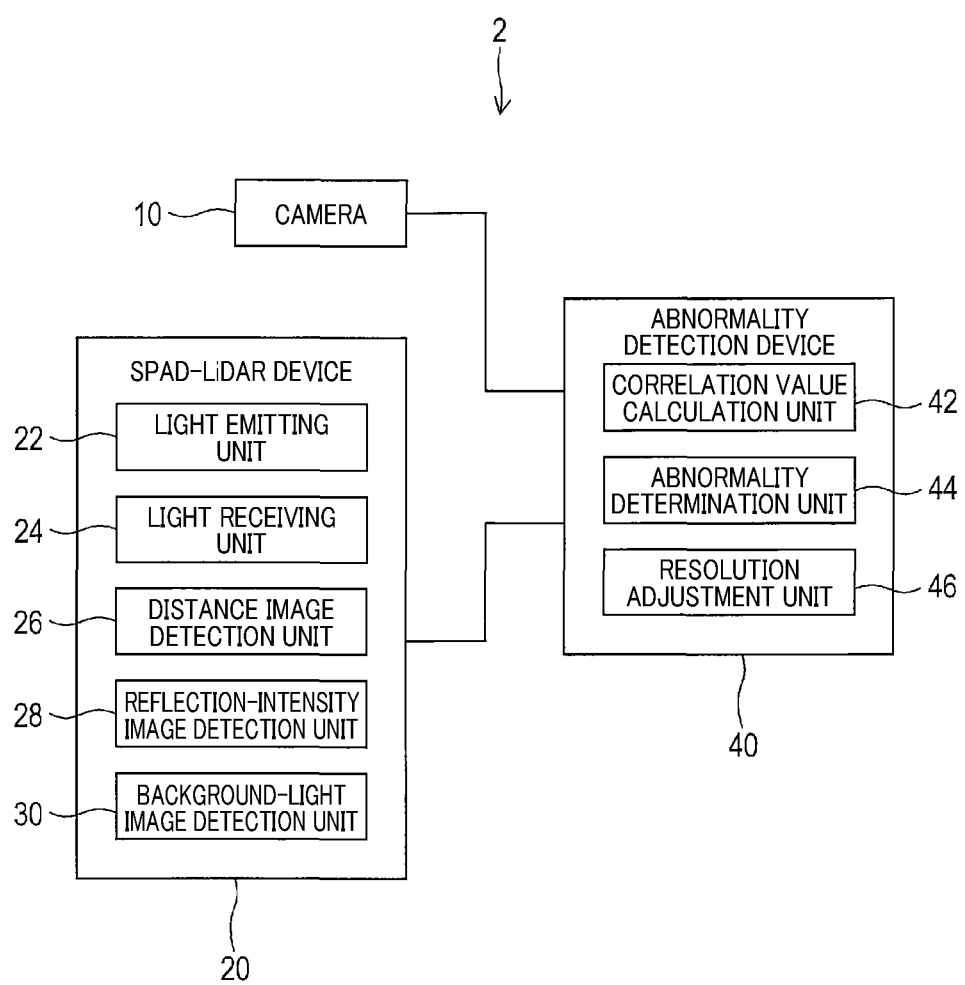
FIG. 1 is a block diagram of an abnormality detection device according to a first embodiment.

In the known technique as described in JP 2014-070936 A, it is assumed that the camera is working properly and the second brightness image that the camera captures is free of abnormalities. However, according to a result of detailed research that was performed by the present inventors, the following issue was found with the technique described in JP 2014-070936 A.

In other words, since it is assumed that the camera is working properly, it is impossible to detect an abnormality in the camera.

In view of the foregoing, it is desired to have a technique for detecting an abnormality even if it is occurring in either the optical sensor or the camera that are used to detect objects around the vehicle.

One aspect of the present disclosure provides an abnormality detection device for detecting whether there is an abnormality in either of an optical sensor and a camera that are used to detect objects around a vehicle. The abnormality detection device includes a correlation value calculation unit and an abnormality determination unit.

The correlation value calculation unit is configured to calculate a correlation value between at least one of a reflection intensity image that is detected by the optical sensor emitting light toward surroundings of the vehicle and then receiving reflected light of emitted light and a background light image that is detected by the optical sensor receiving light from the surroundings of the vehicle while the optical sensor is emitting no light, and a captured image of the surroundings of the vehicle from the camera.

The abnormality determination unit is configured to, in response to the correlation value calculated by the correlation value calculation unit being out of a predefined range, determine that there is an abnormality in either of the optical sensor and the camera.

This configuration can make it possible to detect an abnormality even if it is occurring in either the optical sensor or the camera.

Hereinafter, exemplary embodiments of the present disclosure will be described in detail with reference to the accompanying drawings, in which like reference numerals refer to like elements, duplicated description thereof will be omitted.

1. First Embodiment

1-1. Configuration

The vehicle-mounted abnormality detection system 2 illustrated in FIG. 1 includes a camera 10, a SPAD-LiDAR device 20, and an abnormality detection device 4. The SPAD-LiDAR device 20 includes a light emitting unit 22, a light receiving unit 24, a distance image detection unit 26, a reflection-intensity image detection unit 28, and a background-light image detection unit 30. SPAD is an abbreviation for Single Photon Avalanche Diode. LiDAR is an abbreviation for Light Detection and Ranging.

The abnormality detection device 40 includes a correlation value calculation unit 42, an abnormality determination unit 44, and a resolution adjustment unit 46. The abnormality detection device 40 is configured to detect whether there is an abnormality in either of the camera 10 and the SPAD-LiDAR device 20 that are used by an object detection device (not shown) to detect objects around the vehicle. The SPAD-LiDAR is hereinafter simply referred to as LiDAR.

The light emitting unit 22 of the LiDAR device 20 uses a drive unit (not shown) using a voice coil or the like to intermittently emit pulsed laser light while horizontally scanning, at a constant frame rate, a predefined forward region in the travel direction of the vehicle as an example of an arbitrary direction around the vehicle.

Figure 2:
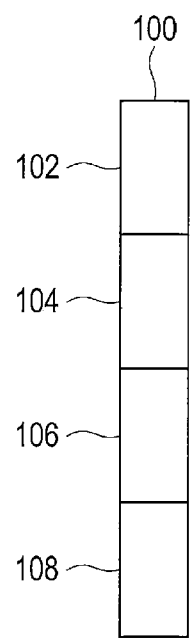
FIG. 2 is a schematic diagram illustrating a light emitting unit.

As illustrated in FIG. 2, the light emitting unit 22 includes an LD array 100 of four LDs 102-108. The LD array 100 of the four LDs 102-108 emits a vertically long laser light and horizontally scans a predefined region ahead of the vehicle. LD is an abbreviation for Laser Diode.

The light receiving unit 24 receives reflected light, of the laser light emitted by the light emitting unit 22, from an object, sunlight or light from a light source, such as an illumination lamp, and background light that is reflected light, of light from the light source, from the object.

Figure 3:
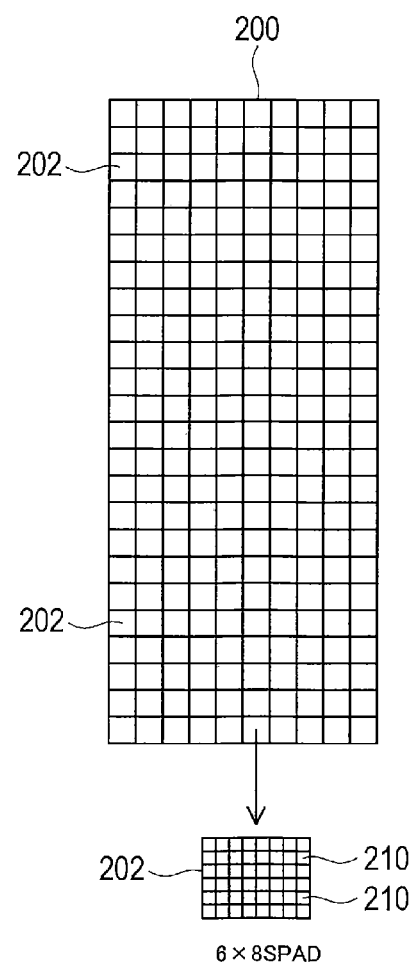
FIG. 3 is a schematic diagram illustrating a light receiving unit.

As illustrated in FIG. 3, the light receiving unit 24 has a plurality of pixels 202 arranged two-dimensionally on a light receiving surface 200. Each pixel includes a plurality of light receiving elements 210. In FIG. 3, one pixel 202 is formed of a 6×8 array of 48 light receiving elements 210. Each of the light receiving elements 210 outputs a light reception signal having a current value corresponding to the received light intensity.

SPADs that operate in Geiger mode as avalanche photodiodes are used as the light receiving elements 210. Avalanche photodiodes or photodiodes other than the SPADs may be used as the light receiving elements 210.

The distance image detection unit 26 of the LiDAR device 20 detects a distance to an object for each pixel 202 based on a time from emission of laser light by the light emitting unit 22 to reception of reflected light by the light receiving unit 24, thereby detecting a distance image as an entire image of the predefined region ahead of the vehicle.

The reflection-intensity image detection unit 28 detects the intensity of reflected light of the laser light emitted by the light emitting unit 22, received by the light receiving unit for each pixel 202, thereby detecting a reflection intensity image as an entire image of the predefined region ahead of the vehicle.

The background-light image detection unit 30 detects the intensity of background light received by the light receiving unit 24 for each pixel 202 while the light emitting unit 22 is not emitting laser light, thereby detecting a background light image as an entire image of the predefined region ahead of the vehicle. In the present embodiment, the intensity of the reflected light and the intensity of the background light are represented in gray scale by luminance.

Figure 4:
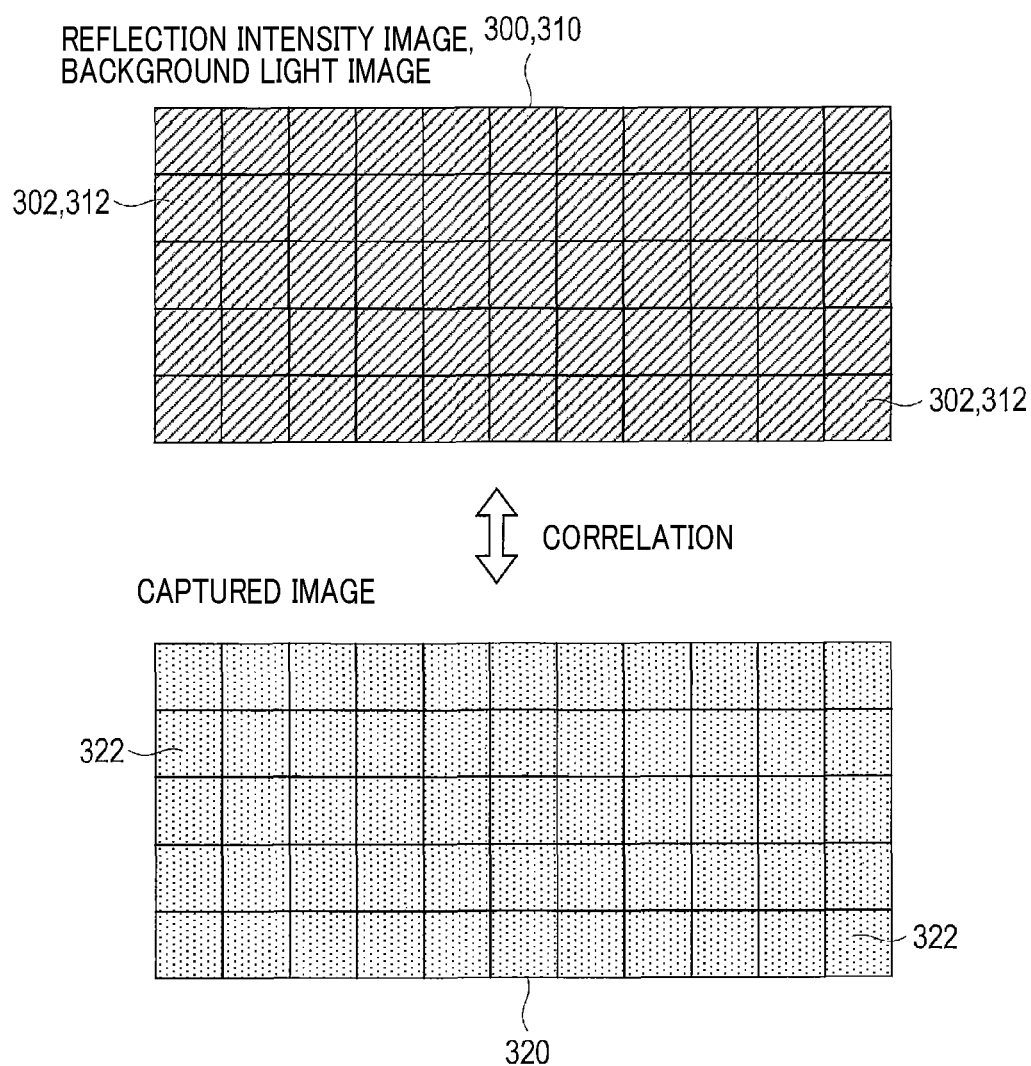
FIG. 4 is a schematic diagram illustrating a reflection intensity image or background light image and a captured image, which are divided into subregions.

As illustrated in FIG. 4, the reflection intensity image 300 detected by the reflection-intensity image detection unit 28 is divided into subregions 302. The background light image 310 detected by the background-light image detection unit 30 is divided into subregions 312. The captured image 320 from the camera 10 is divided into subregions 322 corresponding to the subregions 302, 312. The horizontal division number (or the number of horizontal divisions) and the vertical division number (or the number of vertical divisions) are arbitrary numbers greater than or equal to one, and may be set as appropriate. A division number of 1 means no division.

The subregions 302, 312, and 322 are included in an overlapping region between the reflection intensity image 300, the background light image 312, and the captured image 322.

The correlation value calculation unit 42 of the abnormality detection device 40 calculates, using a correlation function, correlation values for mutually corresponding subregions 302, 312, 322 between the captured image 320 from the camera 10 and at least one of the reflection intensity image 300 detected by the reflection-intensity image detection unit 28 and the background light image 310 detected by the background-light image detection unit 30. Each of the correlation values for the mutually corresponding subregions 302, 312, 322 may be expressed by a sum of correlation values for respective pixels.

The abnormality determination unit 44 compares the correlation values calculated by the correlation value calculation unit 42 for the subregions 302, 312, 322 with the predefined range, and if the correlation values are out of the predefined range, determines that there is an abnormality in either of the camera 10 and the LiDAR device 20. The abnormality in the camera 10 or the LiDAR device 20 may be caused by a malfunction of the camera 10 itself or the LiDAR device 20 itself, or may be caused by dust or contamination adhering to sensing elements of the camera 10 or the LiDAR device 20, or pixel failures in the camera 10 or the LiDAR device 20.

The abnormality determination unit 44 sets the predefined range to be compared with the correlation values as follows. The abnormality determination unit 44, for example, stores data of the correlation values that have been calculated by the correlation value calculation unit 42 so far and calculates the standard deviation a of the correlation values. Then, the abnormality determination unit 44 sets the predefined range to be within five standard deviations (56) of absolute values of the correlation values.

In response to determining that there is an abnormality in either of the camera 10 and the LiDAR device 20, the abnormality determination unit 44 actuates a cleaning device installed on a lens of the camera 10 or a light transmitting part of LiDAR device 20, if any. In a case where the contamination is removed by actuating the cleaning device and the correlation values falls within the predefined range, it may be determined that the abnormality is likely to be caused by caused by the contamination. In a case where the correlation values are out of the predefined range even after actuation of the cleaning device, it may be determined that the abnormality is likely to be caused by something other than the contamination.

A determination as to in which one of the camera 10 and the LiDAR device 20 there is an abnormality may be made in the following manner.

For each subregion with the correlation value out of the predefined range, the abnormality determination unit 44 checks a temporal history of luminance for each pixel of the 320 captured image and a temporal history of luminance for each pixel of at least one of the reflection intensity image 300 and the background light image 310. The abnormality determination unit 44 determines that there is an abnormality in one of the camera 10 and the LiDAR device 20, which has the luminance unchanged in at least any one of the temporal histories.

For each subregion with the correlation value out of the predefined range, the abnormality determination unit 44 also checks a temporal history of the number of edges in the captured image 320 and a temporal history of the number of edges in at least one of the reflection intensity image 300 and the background light image 310. The abnormality determination unit 44 determines that there is an abnormality in one of the camera 10 and the LiDAR device 20, which has the number of edges continuously kept at or above a predefined value in at least any one of the temporal histories.

Once one of the camera 10 and LiDAR device 20 in which there is an abnormality is identified, the object detection device detects objects around the vehicle using only the other of the camera 10 and LiDAR device 20, that is, one of the camera 10 and LiDAR device 20 in which there is no abnormality.

In a case where there is an abnormality in either of the camera 10 and LiDAR device 20 for a certain subregion (for which the correlation value is out of the predefined range) and there is no abnormality in each of the camera 10 and LiDAR device 20 for each of the other subregions, one of the camera 10 and LiDAR device 20, in which there is no abnormality, may be used for the certain subregion and both of the camera 10 and the LiDAR device 20 may be used for the other subregions, thereby detecting objects around the vehicle.

For the device with an abnormality occurring in a certain subregion, a diagnostic code indicative of the abnormality is stored in a flash memory or the like, whereby the location of the abnormality in the object detection device can be identified and may be replaced with a component that works properly.

In a case where the correlation value for each subregion is out of the predefined range, it may be considered that there is an abnormality in a power supply path to the camera 10 and the LiDAR device 20 or that the entire light-emitting unit of the LiDAR device 20 is poorly luminescent. Also in this case, a diagnostic code indicative of the abnormality is stored in a flash memory or the like, whereby the location of the abnormality in the object detection device can be identified and may be replaced with a component that works properly.

In a case where the correlation values for all the subregions that are irradiated with laser light from certain one or more of the four LDs 102-108 of the LD unit 100 are always out of the predefined range, the certain one or more of the four LDs 102-108 of the LD unit 100 may be considered to be poorly luminescent. Also in this case, a diagnostic code indicative of the abnormality is stored in a flash memory or the like, whereby the location of the abnormality in the object detection device can be identified and may be replaced with a component that works properly.

In response to it being determined that there is an abnormality in either of the camera 10 and the LiDAR device 20 because of the correlation value(s) being out of the predefined range, the resolution adjustment unit 46 directs the LiDAR device 20 to increase the resolution of each of the reflection intensity image and the background light image 310 in the subregion(s) determined to have an abnormality.

Usually, the resolution of each of the reflection intensity image 300 and the background light image 310 detected by LiDAR device 20 is lower than that of the captured image from the camera 10. Therefore, increasing the resolution of each of the reflection intensity image 300 and the background light image 310 in the subregion(s) determined to have an abnormality allows the resolution of each of the reflection intensity image 300 and the background light image 310 to approach the resolution of the captured image 320.

Methods (1) through (3) for increasing the resolution of each of the reflection intensity image 300 and the background light image 310 in the subregion(s) determined to have an abnormality will now be described.

(1) Reduction in Detection Region

Figure 5:
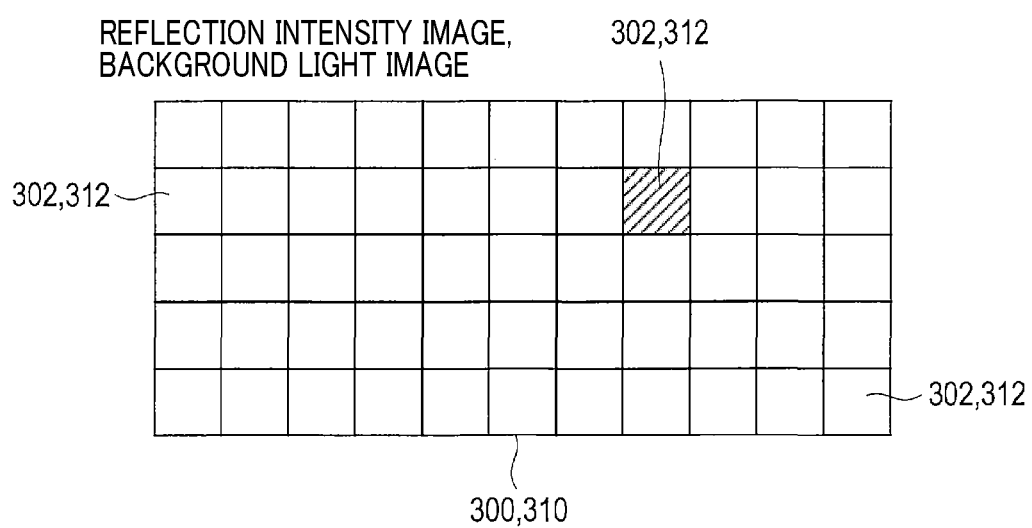
FIG. 5 is a schematic diagram illustrating a subregion determined to have an abnormality.

For example, as illustrated in FIG. 5, in a case where the correlation value for the shaded subregion in each of the reflection intensity image 300 and the background light image 310 is out of the predefined range, the resolution adjustment unit 46 directs the LiDAR device 20 to scan again only a horizontal detection region corresponding to the shaded subregion 302, 312 at the same frame rate as when it scans a predefined region ahead of the vehicle.

At the same frame rate, the resolution of the subregion 302, 312 determined to have an abnormality increases as the detection region is reduced.

When increasing the resolution of the reflection intensity image 300, laser light is emitted from the light emitting unit 22 and reflected light of the laser light is received by the light receiving unit 24, whereby the subregion is scanned. When increasing the resolution of the background light image 310, laser light is not emitted from the light emitting unit 22 and background light is received by the light receiving unit 24, whereby the subregion is scanned.

For the subregion whose resolution has been increased by the direction from the resolution adjustment unit 46, the correlation value is calculated again by the correlation value calculation unit 42. If the correlation value calculated again by the correlation value calculation unit 42 is out of the predefined range, the abnormality determination unit 44 determines that either the camera 10 or the LiDAR device 20 is determined to have an abnormality.

(2) Adjustment of Scanning Angle

The resolution adjustment unit 46 decreases the scanning angle interval for a horizontal detection region corresponding to the shaded subregion 302, 312 as illustrated in FIG. 5 to be less than the normal scanning angle interval when scanning a predefined region ahead of the vehicle, and increases the scanning angle interval for a horizontal detection region corresponding to the other subregions 302, 312 to be greater than the normal scanning angle interval. Then, the resolution adjustment unit 46 directs the LiDAR device 20 to scan the predefined region.

As the scanning angle interval decreases, the resolution of the shaded subregion 302, 312 determined to have an abnormality increases. It is desirable to set the scanning angle interval such that the number of scans of the predefined region ahead of the vehicle is kept unchanged even if the scanning angle interval is changed.

(3) Decrease in the Number of SPADs Per Pixel

The resolution adjustment unit 46 decreases the number of SPADs allocated per pixel in the subregion determined to have an abnormality and then directs the LiDAR device 20 to perform scanning again. The number of pixels in the subregion determined to have an abnormality increases as the number of SPADs per pixel in the subregion decreases, which leads to a higher resolution.

Figure 6:
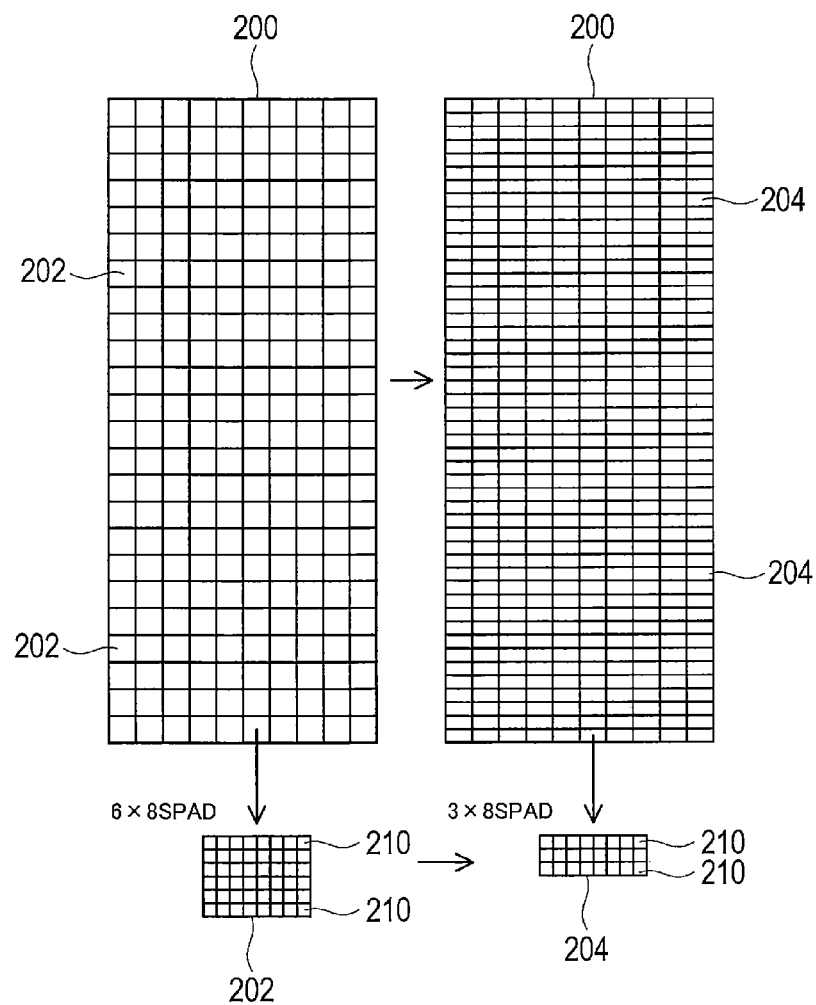
FIG. 6 is a schematic diagram illustrating the light receiving unit with the resolution increased.

For example, as illustrated in FIG. 6, given 6×8 SPADs 210 per pixel 202 on the light-receiving surface 200 of the light receiving unit 24, 3×8 SPADs 210 per pixel 204 leads to a vertically higher resolution. Alternatively, the horizontal resolution may be increased by decreasing the number of SPADs per pixel in the horizontal direction.

1-2. Abnormality Detection Process

An abnormality detection process performed by the abnormality detection device 40 will now be described with reference to the flowchart in FIG. 7. The abnormality detection process is performed once every few cycles of an object detection process or once when a vehicle start switch is turned on.

Figure 7:
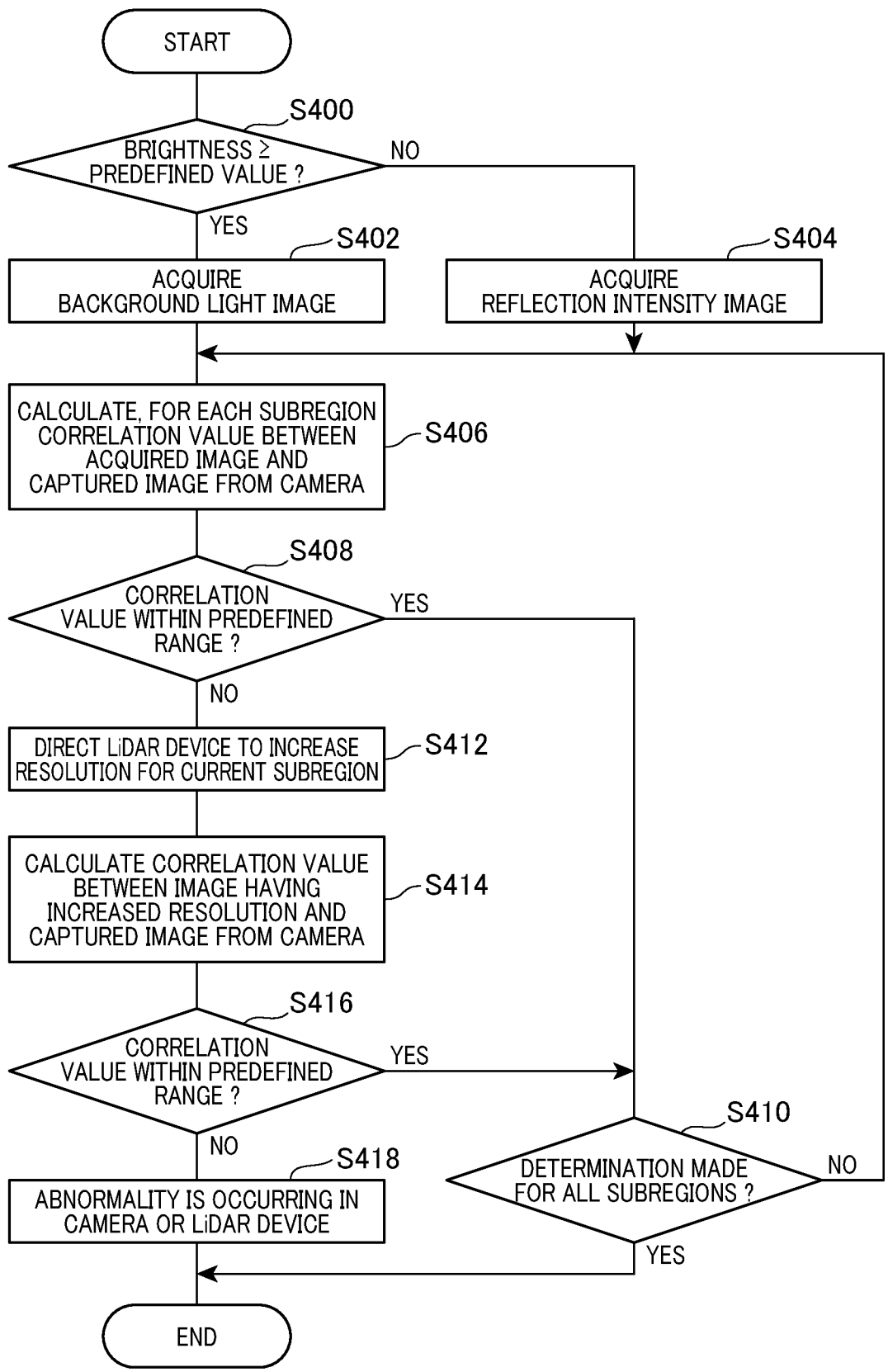
FIG. 7 is a flowchart of an abnormality detection process.

At S400 in FIG. 7, the correlation value calculation unit 42 determines whether the brightness around the vehicle is at or above a predefined value.

For example, a determination as to whether the brightness around the vehicle is at or above the predefined value may be made by comparing a detected value from a light capture sensor, if any, and the predefined value.

Alternatively, whether or not the vehicle is equipped with a light capture sensor, a determination as to whether the brightness around the vehicle is at or above the predefined value may be made based on whether the reflection intensity image is bright or dark and whether the background light image is bright or dark.

A determination as to whether the reflection intensity image is bright or dark is made based on whether the average value of reflected light received by the light receiving unit 24 for each pixel is at or above a predefined value. Similarly, a determination as to whether the background light image is bright or dark is made based on whether the average value of background light received by the light receiving unit 24 for each pixel is at or above a predefined value. The predefined values used in determining whether the reflection intensity image and the background light image are bright or dark, respectively, may be the same or different.

In a case where the reflection intensity image is bright and the background light image is dark, the brightness around the vehicle is below the predefined value and the surroundings of the vehicle are determined to be dark. In a case where both the reflection intensity image and the background light image are bright, the brightness around the vehicle is at or above the predefined value and the surroundings of the vehicle are determined to be bright.

In a case where both the reflection intensity image and the background light image are dark, the correlation value out of the predefined range, between the captured image acquired from the camera 10 in a later stage and the reflection intensity image or the background light image, leads to a determination that the LiDAR device 20 is malfunctioning.

If the answer is YES at S400, that is, if the brightness around the vehicle is at or above the predefined value, then at S402 the correlation value calculation unit 42 acquires, from the LiDAR device 20, a background light image between which and the captured image from the camera 10 a correlation value is to be calculated. This is because, if the brightness around the vehicle is at or above a predefined brightness, the intensity of background light is sufficiently high, and the intensity at each pixel in the background light image may also be determined to be sufficiently high.

If the answer is NO at S400, that is, if the brightness around the vehicle is below the predefined value, then at S404 the correlation value calculation unit 42 acquires, from the LiDAR device 20, a reflection intensity image between which and the captured image from the camera 10 a correlation value is to be calculated. This is because, if the brightness around the vehicle is below the predefined brightness, the intensity of background light is low and thus the intensity at each pixel in the background light image is also low, which leads to a determination that the reflection intensity image is higher in intensity than the background light image.

At S406, using a correlation function, the correlation value calculation unit 42 calculates, for each subregion, a correlation value between either of the background light image and the reflection intensity image acquired at S402 or S404 and the captured image from the camera 10.

At S408, the abnormality determination unit 44 determines whether the correlation value calculated for the current subregion is within the predefined range. When the correlation becomes stronger as the correlation value increases, whether the correlation value is within the predefined range is determined based on whether the correlation value is greater than or equal to a predefined value. When the correlation becomes stronger as the correlation value decreases, whether the correlation value is within the predefined range is determined based on whether the correlation value is less than or equal to the predefined value.

If the answer is NO at S408, that is, if the correlation value calculated for the current subregion is out of the predefined range, the process proceeds to S412.

If the answer is YES at S408, that is, if the correlation value calculated for the current subregion is within the predefined range, then at S410 the abnormality determination unit 44 determines whether the determination at S408 has been made for all the subregions.

If the answer is NO at S410, that is, if there is at least one subregion for which the determination at S408 has not been made yet, the process proceeds to S406. If the answer is YES at S410, that is, if the determination at S408 has been made for all the subregions, it is determined that no abnormality is occurring in each of the camera 10 and the LiDAR device 20 and both of them are working properly. Then, the process ends.

At S412, for the subregion with the correlation value out of the predefined range, the resolution adjustment unit 46 directs the LiDAR device 20 to increase the resolution of the background light image or the reflection intensity image acquired at S402 or S404 according to the methods (1) through (3) for increasing the resolution.

At S414, the correlation value calculation unit 42 calculates, for the current subregion, a correlation value between the captured image from the camera 10 and the background light image or reflection intensity image with increased resolution.

At S416, the abnormality determination unit 44 determines whether the correlation value calculated again for the current subregion is within the predefined range. If the answer is YES at S416, that is, if the correlation value calculated again for the current subregion is within the predefined range, the abnormality determination unit 44 determines that there is no abnormality in each of the camera 10 and the LiDAR device 20. Then, the process proceeds to S410.

If the answer is NO at S416, that is, if the correlation value calculated again for the current subregion is out of the predefined range, then at S418 the abnormality determination unit 44 determines that there is an abnormality in either of the camera 10 and the LiDAR device 20. In such a case, the object detection process using the camera 10 and LiDAR device 20 is suspended.

1-3. Advantages

The first embodiment described above can provide the following advantages.

(1a) Calculating the correlation value between one of the reflection intensity image and the background light image detected by the LiDAR device 20 and the captured image from the camera 10 enables detection of an abnormality even if it is occurring in either the LiDAR device 20 or the camera 10.

(1b) Given a provisional determination that there is an abnormality based on the correlation value between one of the reflection intensity image and the background light image and the captured image calculated for a certain subregion, the resolution of the one of the reflection intensity image and the background light image is increased in the certain subregion and then the image is detected again. This allows the correlation value between one of the reflection intensity image and the background light image, whose resolution has been increased, and the captured image, to be calculated with high accuracy, enabling accurate abnormality determination.

(1c) Given a detection region limited to a certain subregion for which it is provisionally determined that there is an abnormality, the LiDAR device 20 is directed to increase the resolution of the reflection intensity image or the background light image not over the image but only in the certain subregion, and then the image is detected again. Therefore, a correlation value between one of the the reflection intensity image and the background light image, whose resolution has been increased, and the captured image is calculated not for the entire image, but for the certain subregion for which it is provisionally determined that there is an abnormality. This can reduce the processing load necessary to make an abnormality determination.

(1d) One of the reflection intensity image and the background light image, between which and the captured image from the camera 10 a correlation value is to be calculated, is selected based on the brightness around the vehicle. This can reduce the processing load necessary to make an abnormality determination as compared to the processing load necessary to make an abnormality determination by calculating a correlation value between each of the reflection intensity image and the background light image and the captured image.

In the above embodiment, the LiDAR device 20 corresponds to an optical sensor.

2. Second Embodiment 2-1. Differences from First Embodiment

Figure 8:
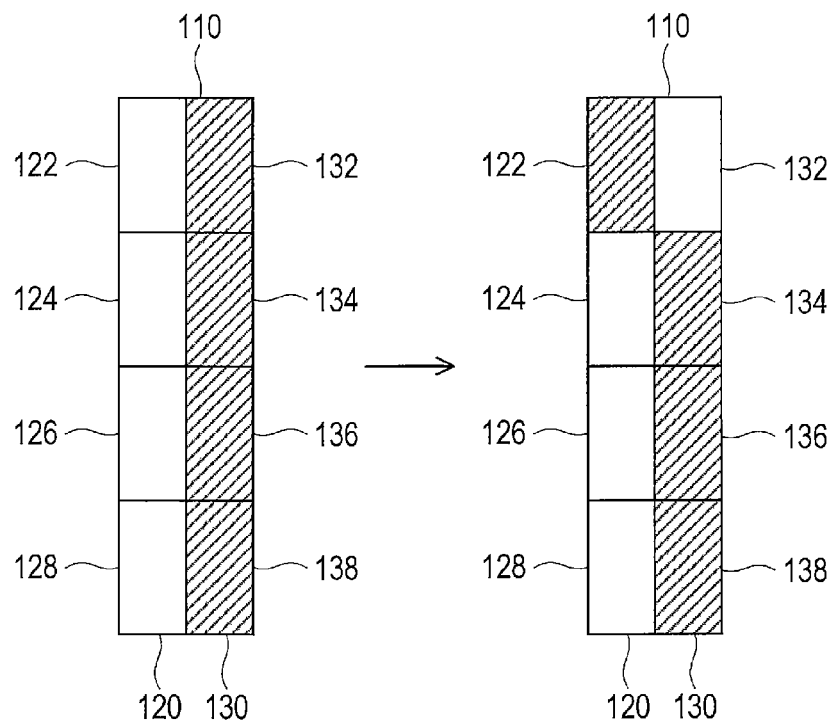
FIG. 8 is a block diagram illustrating a light emitting unit according to a second embodiment.

The second embodiment is similar in basic configuration to the first embodiment, except in that the LD unit 110 of the light emitting unit 22 of the second embodiment illustrated in FIG. 8 includes, in addition to the normally used first LD unit 120, a spare second LD unit 120. Like reference numbers indicate like elements as in the first embodiment. As for these elements, the preceding description should be referenced.

2-2. Abnormality Detection Process

As illustrated in FIG. 8, the light emitting unit 22 of the second embodiment normally emits laser light from four LDs 122 to 128 of the first LD unit 120, and normally emits no laser light from LDs 132 to 138 of the second LD unit 130. In FIG. 8, some of the LDs 122-128 and the LDs 132-138, which are in use, are indicated white, the others of the LDs 122-128 and the LDs 132-138, which are not in use, are indicated by hatched lines.

In a case where the correlation values calculated for all of the subregions irradiated with the laser light from, for example, the LD 122 of the four LDs 122 to 128 of the first LD unit 120, are always out of the predefined range, the abnormality determination unit 44 determine that the LD 122 is poorly luminescent.

In such a case, the abnormality determination unit 44 directs the light emitting unit 22 to emit laser light not from the faulty LD 122, but from the LD 132, adjacent to the faulty LD 122, of the second LD unit 130.

2-3. Advantages

In addition to the advantages of the first embodiment, the second embodiment can provide the following advantage.

(2a) In a case where some of the four LDs 122-128 of the first LD unit 120, for example, the LD 122, is poorly luminescent, laser light will be emitted not from the faulty LD 122, but from the LD 132, adjacent to the faulty LD 122, of the second LD unit 130. This allows the object detection device to normally continue the object detection process.

3. Other Embodiments

As above, while the specific embodiments of the present disclosure have been described above, the present disclosure is not limited to the above-described embodiments, and may be implemented with various modifications.

(3a) In the above embodiment, one of the reflection intensity image and the background light image, between which and the captured image from the camera 10 a correlation value is to be calculated, is selected based on the brightness around the vehicle. In an alternative embodiment, regardless of the brightness around the vehicle, the correlation value between each of the reflection intensity image and the background light image, and the captured image, may be calculated to determine whether there is abnormality. In such an embodiment, if the correlation value between at least one of the reflection intensity image and the background light image, and the captured image, is within the predefined range, the camera 10 and the LiDAR device 20 may be determined to be working properly.

(3b) In the above embodiment, an abnormality determination is made based on the correlation value between either of the reflection intensity image and the background light image, and the captured image, which is calculated for each of subregions into which the entire image is divided. In an alternative embodiment, without dividing the image into subregions, an abnormality determination may be made based on the correlation value between either or each of the reflection intensity image and the background light image, and the captured image, which is calculated for the entire image.

In such an embodiment, prior to making an abnormality determination, the resolution of either or each of the reflection intensity image and the background light image may be increased and then the correlation value between either or each of the reflection intensity image and the background light image, and the captured image, may be calculated.

(3c) In the above embodiment, the light emitting unit 22 of the LiDAR device 20, which is an optical sensor, emits pulsed laser light intermittently while horizontally scanning a predefined region ahead of the vehicle in the direction of travel, and the light receiving unit 24 receives reflected light from an object.

In an alternative embodiment, high power laser light may be emitted toward the predefined area ahead of the vehicle in the direction of travel, and reflected light may be received by a two-dimensional light receiving element array. This allows an object in the predefined region ahead of the vehicle in the direction of travel to be detected with a single emission from the light emitting unit.

In such an embodiment, in a case where the correlation value between either of the reflection intensity image and the background light image, and the captured image, is determined to be out of the predefined range, the resolution adjustment unit 46 may decrease the number of SPADs per pixel and then direct the light sensor to emit light again. Decreasing the number of SPADs per pixel increases the number of pixels corresponding to the predefined region ahead of the vehicle, which leads to increased resolution.

(3d) In the above embodiment, the light emitting unit 22 of the LiDAR device 20, which is an optical sensor, emits a vertically elongated laser light and horizontally scans a predefined region ahead of the vehicle in the direction of travel. In an alternative configuration of the light emitting unit 22 of the optical sensor 20, the light emitting unit 22 of the LiDAR device 20 may emit laser light and horizontally and vertically scan the predefined region ahead of the vehicle in the direction of travel.

(3e) The abnormality detection device 40 and its method described in the present disclosure may be implemented by a dedicated computer including a processor and a memory programmed to execute one or more functions embodied by computer programs. Alternatively, the abnormality detection device 40 and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium. The technique for implementing the functions of each part included in the abnormality detection device 40 does not necessarily include software, and all of its functions may be implemented using one or more pieces of hardware.

(3f) A plurality of functions possessed by one constituent element in the foregoing embodiments may be implemented by a plurality of constituent elements, or one function possessed by one constituent element may be implemented by a plurality of constituent elements. In addition, a plurality of functions possessed by a plurality of constituent elements may be implemented by one constituent element, or one function implemented by a plurality of constituent elements may be implemented by one constituent element. Some of the components in the foregoing embodiments may be omitted. At least some of the components in the foregoing embodiments may be added to or replaced with the other embodiments.

(3g) Besides the abnormality detection device 40 described above, the present disclosure can be implemented in various modes, such as a system including the abnormality detection device 40 as a constituent element, a program for causing a computer to serve as the abnormality detection device 40, a non-transitory tangible storage medium, such as a semiconductor memory, having this program stored, an abnormality detection method, and others.

What is claimed is:

1. An abnormality detection device for detecting whether there is an abnormality in either of an optical sensor and a camera that are used to detect objects around a vehicle, the abnormality detection device comprising:
a correlation value calculation unit configured to calculate a correlation value between at least one of a reflection intensity image that is detected by the optical sensor emitting light toward surroundings of the vehicle and then receiving reflected light of emitted light and a background light image that is detected by the optical sensor receiving light from the surroundings of the vehicle while the optical sensor is emitting no light, and a captured image of the surroundings of the vehicle from the camera; and
an abnormality determination unit configured to, in response to the correlation value calculated by the correlation value calculation unit being out of a predefined range, determine that there is an abnormality in either of the optical sensor and the camera.

2. The abnormality detection device according to claim 1, wherein
each light receiving element of a light receiving unit of the optical sensor comprises a single photon avalanche diode (SPAD).

3. The abnormality detection device according to claim 1, wherein
the abnormality determination unit is configured to, in response to the correlation value being out of the predefined range, provisionally determine that there is an abnormality in either of the optical sensor and the camera,
the abnormality detection device further comprises a resolution adjustment unit configured to, in response to the abnormality determination unit provisionally determining that there is an abnormality in either of the optical sensor and the camera, direct the optical sensor to increase resolution of each of the reflection intensity image and the background light image,
the correlation value calculation unit is configured to calculate again the correlation value between at least one of the reflection intensity image and the background light image, whose resolution has been increased by the resolution adjustment unit, and the captured image, and
the abnormality determination unit is configured to, in response to the correlation value calculated again by the correlation value calculation unit being out of the predefined range, determine that there is an abnormality in either of the optical sensor and the camera.

4. The abnormality detection device according to claim 3, wherein
the resolution adjustment unit is configured to, in response to the abnormality determination unit provisionally determining that there is an abnormality in either of the optical sensor and the camera, direct the optical sensor to reduce a detection region to thereby increase the resolution.

5. The abnormality detection device according to claim 3, wherein
the resolution adjustment unit is configured to, in response to the abnormality determination unit provisionally determining that there is an abnormality in either of the optical sensor and the camera, direct the optical sensor to increase the resolution of a detection region for which the correlation value is out of the predefined range, and decrease the resolution of a detection region other than the detection region for which the correlation value is out of the predefined range.

6. The abnormality detection device according to claim 3, wherein
each light receiving element of a light receiving unit of the optical sensor comprises a single photon avalanche diode (SPAD), and
the resolution adjustment unit is configured to, in response to the abnormality determination unit provisionally determining that there is an abnormality in either of the optical sensor and the camera, direct the optical sensor to decrease a number of SPADs per pixel to thereby the increase the resolution.

7. The abnormality detection device according to claim 1, wherein
the correlation value calculation unit is configured to divide at least one of the reflection intensity image and the background light image and divide the captured image into a plurality of corresponding subregions, and calculate the correlation value for each subregion between the at least one of the reflection intensity image and the background light image and the captured image, and the abnormality determination unit is configured to, in response to the correlation value for a certain subregion calculated by the correlation value calculation unit being out of the predefined range, determine that there is an abnormality in either of the optical sensor and the camera.

8. The abnormality detection device according to claim 1, wherein the correlation value calculation unit is configured to, in response to a brightness around the vehicle being at or above a predefined value, calculate the correlation value between the background light image and the captured image, and in response to the brightness around the vehicle being below the predefined value, calculate the correlation value between the reflection intensity image and the captured image.

* * * * *